United States Patent
Lauterbach et al.

(10) Patent No.: US 7,280,809 B2
(45) Date of Patent: Oct. 9, 2007

(54) METHOD FOR ADJUSTING TRANSMISSION PARAMETERS FROM A TRANSMITTER FOR DIGITAL RADIO SIGNALS

(75) Inventors: Thomas Lauterbach, Nuremberg (DE); Frank Hofmann, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 723 days.

(21) Appl. No.: 10/333,661

(22) PCT Filed: May 11, 2001

(86) PCT No.: PCT/DE01/01804

§ 371 (c)(1),
(2), (4) Date: Apr. 23, 2003

(87) PCT Pub. No.: WO02/07370

PCT Pub. Date: Jan. 24, 2002

(65) Prior Publication Data

US 2003/0162512 A1 Aug. 28, 2003

(30) Foreign Application Priority Data

Jul. 19, 2000 (DE) .............................. 100 35 041

(51) Int. Cl.
*H04B 17/00* (2006.01)
*H04B 1/04* (2006.01)
*H03C 1/62* (2006.01)
*H01Q 11/12* (2006.01)
*H04Q 7/00* (2006.01)
*H04K 1/02* (2006.01)
*H04L 25/03* (2006.01)
*H04L 25/49* (2006.01)

(52) U.S. Cl. ................... 455/115.1; 455/127.1; 455/67.11; 370/332; 375/296

(58) Field of Classification Search ............... 455/92, 455/114, 115.1, 115.3, 127.1, 522, 69, 63.1, 455/114.2, 67.11; 370/332, 333, 241; 375/224, 375/296
See application file for complete search history.

(56) References Cited

U.S. PATENT DOCUMENTS 5,511,079 A 4/1996 Dillon (Continued)

FOREIGN PATENT DOCUMENTS

DE 198 49 552 3/2000

(Continued)

OTHER PUBLICATIONS

ETSI STC UmTS-LI: UTRA Physical Layer Description FDD parts (v0.4, Jun. 25, 1998) Tdoc SMG2 UMTS-LI 221/98.

*Primary Examiner*—Nay Maung
*Assistant Examiner*—Andrew Wendell
(74) *Attorney, Agent, or Firm*—Kenyon & Kenyon LLP

(57) ABSTRACT

A method for adjusting transmission parameters of a transmitter for digital radio signals, for example, broadcast signals, is described, in which context a receiving apparatus receives the digital radio signals emitted by the transmitter and transfers data to the transmitter via a return channel, transfer data and reception parameters being contained in the data. The transmitter then optimizes the transmission parameters as a function of these data. It is possible in this context that in the data, the transfer data either contain the received digital radio signals, or already have evaluation data from the receiving apparatus. The method is suitable in particular for digital radio signals that are transferred below 30 MHz. The return channel is operated either in simplex mode from the receiving apparatus to the transmitter, or in duplex mode.

18 Claims, 1 Drawing Sheet

U.S. PATENT DOCUMENTS

| | | | |
|---|---|---|---|
| 5,862,460 A * | 1/1999 | Rich ........................... | 455/116 |
| 6,084,919 A | 7/2000 | Chuprun et al. | |
| 6,175,550 B1 * | 1/2001 | van Nee ..................... | 370/206 |
| 6,230,022 B1 * | 5/2001 | Sakoda et al. .............. | 455/522 |
| 6,445,750 B1 * | 9/2002 | Chen et al. ................. | 375/300 |
| 6,477,154 B1 * | 11/2002 | Cheong et al. ............. | 370/328 |
| 6,549,757 B1 * | 4/2003 | Masse et al. ............ | 455/67.13 |
| 6,556,629 B1 * | 4/2003 | Evans ........................ | 375/297 |
| 6,580,721 B1 * | 6/2003 | Beshai ....................... | 370/428 |
| 6,876,867 B2 * | 4/2005 | Tiedemann et al. ......... | 455/522 |
| 6,993,086 B1 * | 1/2006 | Laurent ..................... | 375/295 |
| 2002/0009061 A1 * | 1/2002 | Willenegger ................ | 370/328 |
| 2005/0007977 A1 * | 1/2005 | Jou ........................... | 370/328 |

FOREIGN PATENT DOCUMENTS

| | | |
|---|---|---|
| EP | 0 772 317 | 5/1997 |
| EP | 0 848 515 | 6/1998 |

* cited by examiner

METHOD FOR ADJUSTING TRANSMISSION PARAMETERS FROM A TRANSMITTER FOR DIGITAL RADIO SIGNALS

CROSS-REFERENCE TO RELATED APPLICATIONS

This application is a national phase application of International Application No. PCT/DE01/01804 filed on May 11, 2001, and claims priority of German Patent Application No. 100 35 041.0 filed Jul. 19, 2000.

FIELD OF THE INVENTION

The present invention relates to a method for adjusting transmission parameters of a transmitter for digital radio signals.

BACKGROUND INFORMATION

In a DAB (digital audio broadcasting) system, digital radio signals may be transferred in particular for mobile reception in motor vehicles. DRM (Digital Radio Mondial) may provide a digital broadcast transfer system configured for transfer bands below 30 MHz. Transmission parameters may be adjusted with the aid of propagation forecasts, en-route measurements, or listener reports. Regional environmental influences that are of interest in particular for DRM may thereby be taken into account. Changes over time may not be sufficiently detected with these methods.

ETSI STC SMG2 UmTS-L1: UTRA Physical Layer Description FDD parts (v0.4, 1998-06-25) Tdoc SMG2 UMTS-L1 221/98 describes, in a mobile radio system, how the base station may adjust its transmission parameters as a function of signals received from mobile radio units. German Published Patent Application No. 198 49 552 describes how transmitted power level of mobile transmit/receive units may be ascertained by the evaluation of received control commands and by a subsequent adaptive calculation in which step intervals that are modifiable in accordance with the control command are adjusted in the context of the transmitted power level control process.

U.S. Pat. No. 6,084,919 describes a configuration made up of a transmitter and a receiver. The receiver, as a function of a spectral analysis, may send feedback to the transmitter which thereupon performs modulation and/or coding.

U.S. Pat. No. 5,511,079 describes a bidirectional satellite broadcast system.

European Patent Application No. 0 848 515 describes a bidirectional radio channel for optimization of a radio link.

SUMMARY OF THE INVENTION

An exemplary method according to the present invention for adjusting transmission parameters of a transmitter for digital radio signals may provide automated determination of the transfer and reception quality of the digital radio signals, in particular broadcast signals, and automated adjustment of the transmission parameters. In addition, a return channel that is independent of the radio channel may be used for the digital broadcast signals. With the exemplary method according to the present invention, the transfer quality of the digital broadcast signals may be adapted to regional conditions and improved. The exemplary method according to the present invention may furthermore serve to check the transmitter.

Adjusting transmission parameters of a transmitter for digital radio signals may also be improved.

The digital broadcast signals received by the receiving apparatus may be transferred, at least in part, directly to the transmitter so that the transmitter then itself may perform the evaluation. The receiving apparatus may thus act only as a relay station, and the computation-intensive evaluation may be shifted to the transmitter. Commercial receiving units may be used, provided they have an interface for connection to a return channel, a mobile telephone being connected to the receiving apparatus. Specifically, they then may not require any functions that goes beyond the normal functionality of the receiving apparatus.

The digital broadcast signals may then be transferred via a return channel that is embodied either in wire-conducted fashion, for example the public telecommunications network, or wirelessly, with a high level of error protection.

Alternatively, or additionally, the receiving apparatus may determine the channel parameters and reception parameters from the received digital broadcast signals, so that the transmitter may then need only to optimize its transmitter parameters using the channel parameters and reception parameters. This may be desired if the receiving apparatus has an appropriate arrangement, i.e., a processor, that performs this evaluation, normal operation of the receiving apparatus, i.e., the reception of digital broadcast signals and reproduction of those signals, not being disrupted in that context. It may then be possible, simply by running additional software on the processor of the receiving apparatus, to implement this evaluation capability for the channel parameters. The reception parameters may be evaluated in any case by the receiving apparatus. Functions therefore may then be provided to ensure that the reception parameters are transferred to the transmitter. In the context of combined evaluation in the transmitter and in the receiving apparatus, evaluation of the received broadcast signals may be distributed so that the transmitter may carry most of the evaluation load, since it may be easier to provide more computation performance in a transmitter.

The Doppler spread, echo delay time difference, signal-to-noise separation, and common-channel and adjacent-channel interference may be determined as channel parameters, and a comprehensive characterization of the transfer channel may thus exist. The transmitter may then be capable of optimally adjusting its transmission parameters.

The receiving apparatus may determine the bit error rate and the erroneous checksum tests (cyclic redundancy check=CRC) as reception parameters. These data may also be determined in the receiving apparatus in normal operation upon decoding of the digital broadcast signals, so that the receiving apparatus need not have any additional functionality.

The transmission frequency, channel coding, source data rate, transfer rate, modulation, and transmitted power level may be adjusted as transmitter parameters to be optimized. The transmission frequency may offer the feature that if severe damping phenomena occur on one frequency, a switch to an alternative frequency may be provided. The channel coding may be made simpler or more complex depending on the error rate when viewed in conjunction with the transfer rate and the source data rate. The source data rate may be increased if the transfer conditions are very good. A high volume of usable data may thus be transferred. Under poor conditions with a fixed transfer rate, the channel coding rate may be increased by decreasing the source data rate. Error protection may then thereby be increased. The modulation may also be modified by raising or lowering the modulation depth, if this is possible. With a poor signal-to-noise separation it may be appropriate in particular to increase the transmitted power level, which may be lowered at the receiving apparatus if the signal-to-noise separation is very good.

If different data are being transferred in the digital broadcast signals as services, and different priorities are allocated to the services, the source data rate and the transfer rate may be allocated to said services depending on priority. For example, if a data transfer is also being performed in addition to the normal broadcast program, then under poor transfer conditions the source data rate for the broadcast program may be maintained, while it is decreased for the data service in order to take the poor transfer conditions into account.

If a transfer is accomplished in packets, the repetition rate of the packets may be modified depending on the transfer quality. The repetition rate may accordingly be raised under poor conditions, so that the probability of correct reception of the packets may also be increased. Under very good transfer conditions, the repetition rate may be decreased so that ultimately the net transfer rate may be increased. More information may then therefore be transferred without repetitions in a given time period.

Depending on the transfer condition, when orthogonal frequency division multiplex (OFDM) signals are used, the carrier frequency spacing and the length of the protective interval may be adapted to the transfer condition as transmission parameters. These modified transmission parameters may also be required to be reported to the receiving apparatus, such as, for example, in a service data element that is always transferred in the same fashion. Therefore, correct evaluation of the received data by the receiving apparatus may be provided.

The receiving apparatus may compare the reception parameters and/or the channel parameters (if the receiving apparatus itself evaluates the channel parameters) to threshold values in order to determine whether a transfer to the transmitter via the return channel is required in order to perform an adaptation of the transmitter parameters. This may economize on transfer bandwidth, since a transfer from the receiving apparatus to the transmitter may be performed only if an adaptation of the transmission parameters is required. A permissible working range for the transmission parameters is thereby recited.

The transfer of transfer data and reception parameters may be performed only at specific points in time that are prerecited, since experience may indicate that adaptation of the transmission parameters need not occur continuously. The effects that influence transfer quality, such as environmental influences, may be in some cases diurnally dependent or may change over a period of months.

The return channel may be operated in duplex fashion, so that control and/or interrogation of the receiving apparatus by the transmitter may be accomplished. The return channel may be provided either as a radio channel or as a combination of a radio channel and a wire-conducted transfer. A transfer via the Internet may be desired in this context, since in this case the reception parameters determined by the receiving apparatus may be stored and then retrieved by the transmitter at specific times. For this purpose, reference devices that are used only for checking the reception quality of the digital broadcast signals may simultaneously monitor multiple transmissions on a time- or frequency-multiplexed basis.

The transmitter may be operated in a common-frequency network, the data determined by the receiving apparatus then being transferred to a main station which then transfers appropriate data to the individual transmitters.

An exemplary method according to the present invention may be used for digital broadcast signals that are transferred below 30 MHz. These signals may be susceptible to environmental influences, so that an optimization of the transmitter parameters as a function of measurements by receiving apparatuses may be required in this case.

Lastly, a transmitter and a receiving apparatus may each have an arrangement for performing an exemplary method according to the present invention.

DETAILED DESCRIPTION

Digital broadcast systems possess a variety of transfer modes in which they may be operated. A transfer mode may be characterized by a set of transmission parameters. The transmission parameters include all the parameters that may be adjusted at the transmission end in the source coder, the modulator, and the transmission amplifier. These include, for example, the source data rate, code rate, and transmitted power level. The transfer modes may be used to ensure sufficiently good transfer quality over different transfer channels. These differing properties of the transfer channels result from differences in transmission frequency and from fluctuating propagation conditions. For channels below 30 MHz in particular, considerable fluctuations in channel parameters such as Doppler spread, echo delay time difference, and signal-to-noise separation may occur as a function of time. These may also result in fluctuations in reception parameters. The reception parameters include all the parameters that are measured by the receiver and that provide information about the transfer parameters and reception quality, for example the bit error rate.

As regards fluctuations in the transfer channel, a distinction may be made between short-term (on the order of seconds and minutes) and longer-term (on the order of hours, day, and months).

According to an exemplary method of the present invention, data that were obtained on the basis of received digital broadcast signals are therefore transferred from a receiving apparatus via a return channel to a transmitter. Transfer data and reception parameters are transferred in the data, so that the transmitter adjusts the transmission parameters as a function of those data. The transfer data are either the received digital broadcast data themselves, or channel parameters that are calculated by the receiving apparatus using the received digital broadcast signals. The reception parameters or channel parameters are compared by the receiving apparatus to threshold values so that the return channel is opened, and the data for optimizing the transmission parameters are transferred to the transmitter, only if the values exceed or fall below those thresholds. Alternatively, the data from the receiving apparatus may be transferred from the receiving apparatus to the transmitter at specific pre-recited points in time. With duplex operation of the return channel, the transmitter may query data from the receiving apparatus or may control the receiving apparatus in order to measure specific signals. In this context, a receiving apparatus may receive a variety of broadcast signals that are transferred on a variety of frequencies.

Figure 1:
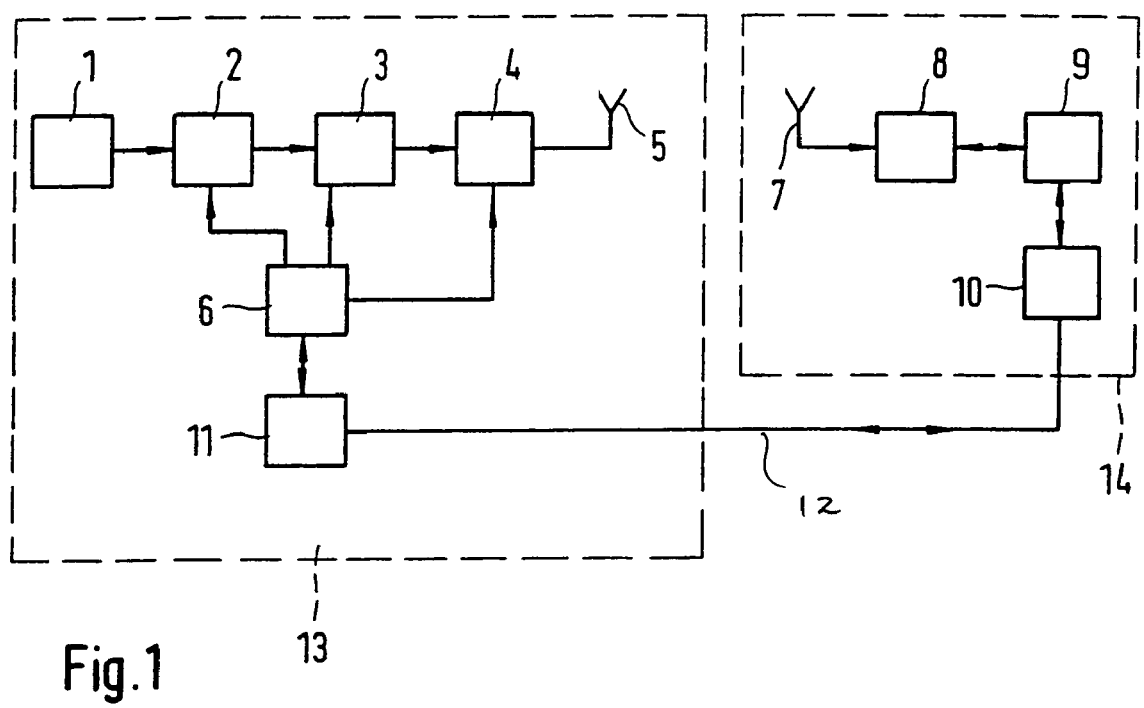
FIG. 1 shows a transfer system.

FIG. 1 depicts a transfer system in which a transmitter 13 transfers digital broadcast signals to a receiving apparatus 14. A further connection between receiving apparatus 14 and transmitter 13 exists via a return channel 12 that is configured in duplex mode.

Transmitter 13 has a data source 1, a source coder 2, a modulator 3, a transmission amplifier 4, an antenna 5, a processor 6, and a communications device 11. Receiving apparatus 14 has an antenna 7, a high-frequency receiver 8, a processor 9, and a communications device 10.

Data source 1 supplies digital data to a first data input of a source coder 2. Processor 6 is connected to a second data input of source coder 2. The output data of source coder 2 are transferred to a first data input of modulator 3. Processor 6 is connected to a second data input of modulator 3. The output data of modulator 3 go to a first data input of a transmission amplifier 4. Processor 6 is connected via its third data output to a second data input of transmission amplifier 4. Processor 6 is connected to communications device 11 via a data input/output. Antenna 5 is connected to an output of transmission amplifier 4. Communications device 11 is connected to return channel 12 via a data input/output.

Antenna 7 is connected to an input of high-frequency receiver 8. High-frequency receiver 8 is connected via a data input/output to processor 9. Processor 9 is connected to communications device 10 via a second data input/output. Communications device 10 is connected via its second data input/output to return channel 12.

The data to be transferred are transferred from data source 1 to source coder 2. Data source 1 in this case is a data memory from which the broadcast signals to be transferred are read and then transferred to source coder 2. A playback unit for audio media (a CD-ROM drive) is present in this case as the data memory. Alternatively, data source 1 may be a microphone with connected electronics, which serves to digitize the acoustic signals that have been converted into electrical signals.

Source coder 2 reduces the data coming from data source 1 in terms of data volume, by removing irrelevant portions from the data that are not required for the reconstruction of the data in receiving apparatus 14.

In modulator 3, data protection is added to the data by channel coding, allowing incorrectly received data to be reconstructed. The data are also modulated. Firstly the information contained in the data is modulated by an angle modulation, in this case a quadrature amplitude modulation; and then the modulation symbols thus produced are distributed onto mutually independent frequency carriers (OFDM). A protective interval is also added to the data to be transferred, ensuring that no superimposition of useful data occurs as a result of multipath propagation. A service data element that is required for synchronization and for reception is also added.

In transmission amplifier 4, the data modulated in this fashion are converted into analog signals and amplified. The broadcast signals are then transmitted using antenna 5. Processor 6 optimizes the adjustments of source coder 2, modulator 3, and transmission amplifier 4 as a function of data received by processor 6 from communications device 11. Communications device 11 in turn receives these data via return channel 12 from communications device 10 of receiving apparatus 14.

Receiving apparatus 14 receives, using antenna 7, the digital broadcast signals emitted by transmitter 13. These broadcast signals are then filtered, amplified, and converted into an intermediate frequency by high-frequency receiver 8.

A digitization is also performed in high-frequency receiver 8. The digital data are then transferred to processor 9, which performs a demodulation (first an OFDM demodulation and then a demodulation of the QAM-modulated signals), an error correction, and a source decoding. Processor 9 determines, as the reception parameters, the bit error rate and the erroneous checksum tests that are determined during channel decoding. Processor 9 furthermore removes specific data, constituting the transfer data, from the digital broadcast signals. In DRM, these transfer data are the so-called static data channel (SDC) symbols, as well as pilots that are transferred with a known phase and amplitude and may therefore be used to determine channel parameters which characterize the radio channel. Based on these transfer data, either processor 9 determines the channel parameters, or these data are transferred using communications device 10 to transmitter 13 via return channel 12. In addition, the reception parameters determined by receiving apparatus 14 are transferred to transmitter 13.

Return channel 12 is in this case a combination of a radio transfer using a mobile radio system—for example GSM (Global System for Mobile Communication) or GPRS (General Packet Radio System) or UMTS (Universal Mobile Telecommunication System)—and a wire-conducted transfer mode via the public telecommunications network, i.e. ISDN or Internet. Alternatively, an exclusively radio connection or an exclusively wire-conducted connection may exist between transmitter 13 and receiving apparatus 14. Additionally, more than one receiving apparatus may receive the digital broadcast signals and may convey these data via a return channel to transmitter 13. It is then left up to transmitter 13 to perform an optimization using these various data of the individual receiving apparatuses.

Figure 2:
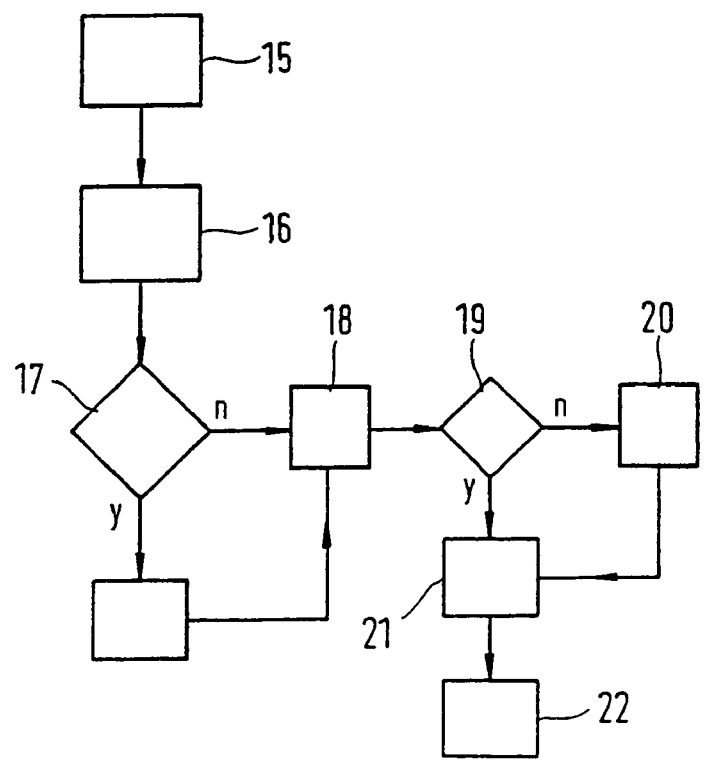
FIG. 2 shows an exemplary method according to the present invention as a flow chart.

FIG. 2 depicts an exemplary method according to the present invention as a flow chart. In method step 15, receiving apparatus 14 receives the digital broadcast data via antenna 7. The digital broadcast data are then processed, as presented above, by high-frequency receiver 8 and converted into digital signals. The data are then transferred to processor 9.

In method step 16, processor 9 then performs a determination of the reception parameters. For that purpose, during channel decoding processor 9 determines the bit error rate, in which context the channel coding indicates how many bits were received erroneously. The received digital broadcast signals additionally contain data furnished for the calculation of checksums. These checksums also provide information as to whether the transferred data were or were not transferred correctly. Processor 9 counts the erroneous checksums proportional to the transferred data volume, and indicates the bit error rate and the number of erroneous checksums as the reception parameters, for transfer to transmitter 13.

Method step 17 checks whether receiver 14 or transmitter 13 is to perform the evaluation of the digital broadcast signals in order to determine the channel parameters. If the receiver is to perform the evaluation, then in method step 19, receiving apparatus 14 performs the evaluation of the digital broadcast signals using processor 9. The Doppler spread, echo delay time difference, signal-to-noise separation, and common-channel and adjacent-channel interference of the received digital broadcast signals are determined as the transfer parameters. These parameters are not static.

The Doppler spread describes the time-selective properties of the transfer channel. A time-dependent damping (fading) is observed in this context. The echo delay time difference describes the property of multipath propagation, in which the same signal may arrive at the receiver over different paths. This may be well understood in mobile radio systems and broadcast systems. The signal-to-noise separation describes the ratio between the useful signal and noise. The signal level alone may also be used as a simple indication to provide an indication of damping. The common-channel and adjacent-channel interference indicates the manner in which adjacent channels interfere with one another due to crosstalk. These channel parameters are ascertained from the digital broadcast signals.

In method step 18, the channel parameters are then transferred, with the reception parameters, via return channel 12 using communication device 10. If it was established in method step 17 that determination of the channel parameters is to be performed by transmitter 13, then the transfer data—i.e., the broadcast signals and the reception parameters ascertained by receiving apparatus 14—are transferred to transmitter 13 in method step 18. The embodiment of communications devices 10 and 11 depends on which return channel is used. If a fixed network is used, communications devices 10 and 11 are configured as modems. If a radio channel is used, a transmit/receive station is required. In a development, the transfer data and reception parameters may be stored on an Internet page, and then may be retrieved by transmitter 13 at pre-recited times. If the return channel is embodied in duplex fashion, as presented here, control of receiving apparatus 14 by transmitter 13 is also possible, for example, so that data are queried from the receiving apparatus at specific times. A modification of the reception frequencies may also be provided in this context. An action of this kind may then be performed, in particular, on reference units provided for the purpose.

In method step 19, processor 6 checks whether transmitter 13 is to perform the evaluation of the digital broadcast signals, or whether they have already been evaluated. This is contained in the data that were transferred to transmitter 13 via return channel 12. If no evaluation has been performed by receiving apparatus 14, then in method step 20 this evaluation is performed by processor 6 as set forth above. An optimization of the transmitter parameters is then performed in method step 21. Optimization of the transmitter parameters in method step 21 is also performed immediately if it was established in method step 19 that the evaluation has already been performed. Regarding optimization of the transmitter parameters, it is important to ensure that for specific values for the reception parameters and transmitter parameters, transmitter 13 loads respective specific sets of values for the transmitter parameters, and then transfers those values to source coder 2, modulator 3, and transmission amplifier 4. An index is created from the channel parameters and reception parameters and is then compared with these threshold values in order to load the appropriate set of transmission parameters. Alternatively, processor 6 may calculate a set of transmission parameters from the channel parameters and reception parameters. In that context, processor 6 then knows a model according to which this calculation is performed.

In method step 22, the transmission parameters are then appropriately adjusted so that the digital broadcast signals are now sent with the optimized transmission parameters.

Return channel 12 may also, alternatively, be embodied as a simplex channel, in which case transfer is possible only from receiving apparatus 14 to transmitter 13.

If data are transferred in a packet mode, the repetition rate is then an adjustable transmission parameter. Various services, audio or video or data or prioritized data, may be variously taken into consideration in adjusting the transmission parameters.

What is claimed is:

1. A method for adjusting transmission parameters for digital broadcast signals emitted by a transmitter, comprising:
    receiving, by a plurality of receiving apparatuses, the digital broadcast signals emitted by the transmitter on a broadcast channel at transmission frequencies below 30 MHz;
    transferring data from the plurality of receiving apparatuses to the transmitter via a return channel that is independent of the broadcast channel, the transferred data including at least a portion of one of the received broadcast signals, reception parameters, and broadcast channel parameters; and
    adjusting, by the transmitter, the transmission parameters as a function of the transferred data from the plurality of receiving apparatuses.

2. The method according to claim 1, wherein at least a portion of the received digital broadcast signals is transferred from the plurality of receiving apparatuses to the transmitter to adjust the transmission parameters, and the transmitter ascertains the reception parameters and the broadcast channel parameters from the at least a portion of the received digital broadcast signals transferred to the transmitter.

3. The method according to claim 2, wherein the plurality of receiving apparatuses evaluate the reception parameters and the broadcast channel parameters using the at least a portion of the received digital broadcast signals, and wherein the transmitter uses the reception parameters and the broadcast channel parameters to adjust the transmission parameters.

4. The method according to claim 3, further comprising:
    determining at least one of a Doppler spread, an echo-delay time difference, a signal-to-noise separation, a common-channel interference and an adjacent-channel interference of the received digital broadcast signals from the broadcast channel parameters, for the adjustment of the transmission parameters.

5. The method according to claim 4, further comprising:
    determining, by the plurality of receiving apparatuses, at least one of a bit error rate of the received digital broadcast signals and a number of erroneous checksum tests from the reception parameters.

6. The method according to claim 5, wherein the adjustment of the transmission parameters includes adjustment of at least one of transmission frequencies, a channel coding, a source data rate, a modulation, a transmitted power level, and a transfer rate.

7. The method according to claim 6, further comprising:
    if the transfer rate can be distributed over a plurality of services, assigning at least one of the transfer rate and the source data rate to the plurality of services as a function of their priority.

8. The method according to claim 6, further comprising:
    if the digital broadcast signals are transferred in a packet mode, adjusting a packet repetition rate as one the transmission parameters.

9. The method according to claim 6, further comprising:
    if the digital broadcast signals are transferred in an orthogonal frequency multiplex mode, adjusting at least one of a carrier frequency spacing and a length of a protective interval as one of the transmission parameters, wherein the transmission is performed using OFDM.

10. The method according to claim 1, further comprising:

comparing at least one of the channel parameters and the reception parameters to at least one threshold value; and transferring the data via the return channel only if the at least one threshold value is one of exceeded and undershot.

11. The method according to claim 1, wherein at least one of the channel parameters and the reception parameters is evaluated at specific points in time.

12. The method according to claim 1, wherein the return channel is operated in a duplex mode.

13. The method according to claim 1, wherein the transmitter is operated in a common-frequency network, and the at least one receiving apparatus is connected to a main station of the common-frequency network.

14. The method, according to claim 1, wherein the transmitter transmits OFDM signals.

15. A system for adjusting transmission parameters for digital broadcast signals transmitted over a broadcast channel, comprising:

a transmitter including a data source, a source coder, a modulator, a transmission amplifier, an antenna for transmitting the digital broadcast signals, and a processor for ascertaining the transmission parameters; and a plurality of receiving apparatuses for receiving the digital broadcast signals emitted by the transmitter on a broadcast channel at transmission frequencies below 30 MHz, and for transferring data to the transmitter via a return channel that is independent of the broadcast channel, the transferred data including at least a portion of one of the received broadcast signals, reception parameters, and broadcast channel parameters;

wherein the transmitter adjusts the transmission parameters as a function of the transferred data from the plurality of receiving apparatuses.

16. The system according to claim 15, wherein the transmitter further includes a first communication device for communicating via the return channel.

17. The system according to claim 15, wherein each receiving apparatus further includes a second communication device for communicating via the return channel.

18. The system according to claim 15, wherein the transmitter transmits OFDM signals.

* * * * *